United States Patent
Inoue

(10) Patent No.: US 12,319,782 B2
(45) Date of Patent: Jun. 3, 2025

(54) PHASE CONTRAST FILM AND PRODUCTION METHOD THEREFOR

(71) Applicant: ZEON CORPORATION, Tokyo (JP)

(72) Inventor: Kyosuke Inoue, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 585 days.

(21) Appl. No.: 17/635,698

(22) PCT Filed: Aug. 27, 2020

(86) PCT No.: PCT/JP2020/032474
§ 371 (c)(1),
(2) Date: Feb. 16, 2022

(87) PCT Pub. No.: WO2021/039934
PCT Pub. Date: Mar. 4, 2021

(65) Prior Publication Data
US 2022/0282028 A1    Sep. 8, 2022

(30) Foreign Application Priority Data

Aug. 30, 2019  (JP) .................................. 2019-158709

(51) Int. Cl.
| | |
|---|---|
| C08G 61/08 | (2006.01) |
| B29C 55/02 | (2006.01) |
| B29D 7/01 | (2006.01) |
| B29D 11/00 | (2006.01) |

(52) U.S. Cl.
CPC .............. *C08G 61/08* (2013.01); *B29C 55/02* (2013.01); *B29D 7/01* (2013.01); *B29D 11/00788* (2013.01); *B29K 2995/0041* (2013.01); *C08G 2250/00* (2013.01); *C08G 2261/3325* (2013.01); *C08G 2261/57* (2013.01)

(58) Field of Classification Search
CPC ................ C08G 61/08; C08G 2250/00; C08G 2261/3325; C08G 2261/57; B29C 55/02; B29D 7/01; B29D 11/00788; B29K 2995/0041
USPC ..................................................... 359/489.01
See application file for complete search history.

(56) References Cited

U.S. PATENT DOCUMENTS

| | | | |
|---|---|---|---|
| 5,171,834 A | 12/1992 | Funaki | |
| 2010/0055354 A1* | 3/2010 | Sasada | .................... B29C 55/08 428/141 |
| 2010/0222517 A1* | 9/2010 | Hino | .......................... C08J 5/18 525/240 |

(Continued)

FOREIGN PATENT DOCUMENTS

| | | |
|---|---|---|
| CN | 104768729 A | 7/2015 |
| JP | H0264141 A | 3/1990 |

(Continued)

OTHER PUBLICATIONS

JP-2011013378—Murata—2011—English translation.*

(Continued)

*Primary Examiner* — Sharrief I Broome
(74) *Attorney, Agent, or Firm* — KENJA IP LAW PC

(57) ABSTRACT

A phase difference film formed of a resin containing a polymer having crystallizability, wherein:
a coefficient of variation CV(Re) of an in-plane retardation of the phase difference film at a measurement wavelength of 590 nm is 1.0% or less.

6 Claims, 1 Drawing Sheet

(56) References Cited

U.S. PATENT DOCUMENTS

| 2016/0032063 A1* | 2/2016 | Sunaga ............... C08J 5/18 |
| | | 526/255 |
| 2016/0187551 A1 | 6/2016 | Mitobe et al. |
| 2017/0362400 A1 | 12/2017 | Mitobe et al. |
| 2018/0079876 A1* | 3/2018 | Kato ............... C08J 5/18 |
| 2019/0210268 A1 | 7/2019 | Murakami |
| 2020/0025989 A1* | 1/2020 | Mukai ............... G02B 7/008 |

FOREIGN PATENT DOCUMENTS

| JP | 2002131538 A | | 5/2002 |
| JP | 2010079239 A | | 4/2010 |
| JP | 2011013378 A | * | 1/2011 |
| JP | 2014091793 A | | 5/2014 |
| JP | 2016026909 A | | 2/2016 |
| JP | 2016122176 A | | 7/2016 |
| JP | 6406479 B2 | | 10/2018 |
| WO | 2009038142 A1 | | 3/2009 |
| WO | 2014073019 A1 | | 5/2014 |
| WO | 2018062067 A1 | | 4/2018 |

OTHER PUBLICATIONS

Nov. 10, 2020, International Search Report issued in the International Patent Application No. PCT/JP2020/032474.

Mar. 1, 2022, International Preliminary Report on Patentability issued in the International Patent Application No. PCT/JP2020/032474.

* cited by examiner

PHASE CONTRAST FILM AND PRODUCTION METHOD THEREFOR

TECHNICAL FIELD

The present invention relates to a phase difference film and a method for producing the same.

BACKGROUND ART

Technologies for producing a film with resins have been proposed (Patent Literatures 1 to 3).

CITATION LIST

Patent Literature

Patent Literature 1: Japanese Patent Application Laid-Open No. 2016-26909 A
Patent Literature 2: Japanese Patent No. 6406479
Patent Literature 3: Japanese Patent Application Laid-Open No. Hei. 02-64141 A

SUMMARY OF INVENTION

Technical Problem

One of the films produced with resins is a phase difference film. A phase difference film has a retardation in at least one of directions including in-plane directions and the thickness direction, and thus, the film has a birefringence in at least one of the directions including the in-plane directions and the thickness direction.

Such a phase difference film may be produced by, for example, subjecting a resin film to a stretching treatment. In general, when a resin film is subjected to a stretching treatment, molecules of a polymer contained in the resin film are oriented in the stretching direction. Therefore, by orienting molecules of a polymer in a film through a stretching treatment, the film develops a birefringence. Accordingly, a phase difference film having a desired retardation can be obtained.

In recent years, there has been a demand for phase difference films to decrease in thickness. With regards to methods for obtaining a thin phase difference film paging a desired retardation, one example of such a method is increasing the birefringence of a film. However, when the stretching ratio is increased in a stretching treatment in order to achieve a large birefringence, large fluctuations may occur in thickness and optical characteristics, and breakage by stretching is likely to occur. This makes it difficult to stably produce a phase difference film.

Due to the aforementioned circumstances, development of a new technology, as a method for producing a phase difference film, is demanded. As a result of research by the applicant, there has been obtained the knowledge that a film of a resin containing a polymer having crystallizability develops a large birefringence when it is subjected to a heating treatment after a stretching treatment. Based on this knowledge, the applicant attempted to produce a phase difference film by combining a stretching treatment and a heating treatment.

Specifically, the aforementioned method includes developing a birefringence through a stretching treatment and thereafter further increasing the birefringence through a heating treatment. Since this can widen the range of birefringence developed in a film, the thickness can be adjusted with high flexibility while maintaining the magnitude of the retardation. Therefore, achievement of a phase difference film that is thin and has a desired retardation can be expected.

However, by the aforementioned method in which a combination of a stretching treatment and a heating treatment was carried out, large fluctuations in the in-plane retardation Re of the obtained phase difference film were likely to occur.

The present invention has been devised in view of the aforementioned problem, and has as its object to provide a phase difference film having excellent uniformity in in-plane retardation; and a method for easily producing a phase difference film having excellent uniformity in in-plane retardation.

Solution to Problem

The present inventor intensively conducted research for solving the aforementioned problem. As a result, the present inventor has found that when a stretched film formed of a resin containing a polymer having crystallizability, while having tension applied to the film, is brought into contact with an organic solvent, optical characteristics of the stretched film can be adjusted with high uniformity, with the result that a phase difference film having excellent uniformity in in-plane retardation can be obtained. Based on such knowledge, the present inventor accomplished the present invention.

That is, the present invention includes the following.
<1> A phase difference film formed of a resin containing a polymer having crystallizability, wherein:
  a coefficient of variation CV(Re) of an in-plane retardation of the phase difference film at a measurement wavelength of 590 nm is 1.0% or less.
<2> The phase difference film according to <1>, containing an organic solvent.
<3> The phase difference film according to <1> or <2>, wherein the polymer having crystallizability contains an alicyclic structure.
<4> The phase difference film according to any one of <1> to <3>, wherein the polymer having crystallizability is a hydrogenated product of a ring-opening polymer of dicyclopentadiene.
<5> A method for producing a phase difference film, comprising:
  a first step of preparing a stretched film formed of a resin containing a polymer having crystallizability; and
  a second step of bringing the stretched film into contact with an organic solvent, wherein
  tension is applied to the stretched film in the second step.
<6> The method for producing a phase difference film according to <5>, wherein the polymer having crystallizability contains an alicyclic structure.
<7> The method for producing a phase difference film according to <5> or <6>, wherein the polymer having crystallizability is a hydrogenated product of a ring-opening polymer of dicyclopentadiene.

Advantageous Effects of Invention

According to the present invention, there can be provided: a phase difference film having excellent uniformity in in-plane retardation; and a method for easily producing a phase difference film having excellent uniformity in in-plane retardation.

DESCRIPTION OF EMBODIMENTS

Figure 1:
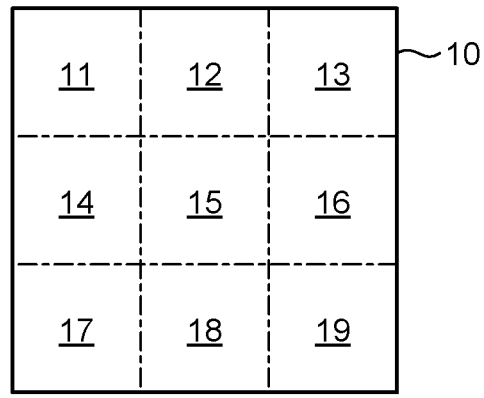
FIG. 1 is a plan view schematically illustrating a stretched film obtained in Example 1.

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, an in-plane retardation Re of a film is a value represented by "Re=(nx−ny)×d" unless otherwise specified. A birefringence in the in-plane directions of a film is a value represented by "(nx−ny)" unless otherwise specified, and is therefore represented by "Re/d". A thickness-direction retardation Rth of a film is a value represented by "Rth=[{(nx+ny)/2}−nz]×d" unless otherwise specified. A birefringence in the thickness direction of a film is a value represented by "[{(nx+ny)/2}−nz]" unless otherwise specified, and is therefore represented by "Rth/d". An NZ factor of a film is a value represented by "(nx−nz)/(nx−ny)" unless otherwise specified, and is therefore represented by "0.5+Rth/Re". Herein, nx represents a refractive index in a direction in which the maximum refractive index is given among directions (in-plane directions) perpendicular to the thickness direction of the film, ny represents a refractive index in a direction, among the above-mentioned in-plane directions of the film, perpendicular to the direction giving nx, nz represents a refractive index in the thickness direction of the film, and d represents the thickness of the film. The measurement wavelength is 590 nm unless otherwise specified.

In the following description, a longitudinal direction and a lateral direction of a film are perpendicular to each other and both are perpendicular to the thickness direction of the film, unless otherwise specified. Generally, in a rectangular film, out of two pairs of edges opposing each other, a direction parallel to one of the pairs of the edges may be the longitudinal direction, and a direction parallel to the other pair of the edges may be the lateral direction. Further, in a long-length film, the lengthwise direction may correspond to the longitudinal direction and the width direction may correspond to the lateral direction.

In the following description, a "long-length" film refers to a film having the length that is 5 times or more the width, and preferably a film having the length that is 10 times or more the width, and specifically refers to a film having a length that allows a film to be wound up into a rolled shape for storage or transportation. The upper limit of the length thereof is not particularly limited, and is usually 100,000 times or less the width.

In the following description, the lengthwise direction of a long-length film is usually parallel to a film conveyance direction in the production line. Furthermore, an MD direction (machine direction) is a film conveyance direction in the production line, and is usually parallel to the lengthwise direction of the long-length film. Furthermore, a TD direction (transverse direction) is a direction parallel to the film surface and perpendicular to the MD direction, and is usually parallel to the width direction of the long-length film.

In the following description, a direction of an element being "parallel", "perpendicular" or "orthogonal" may allow an error within the range of not impairing the advantageous effects of the present invention, for example, within a range of ±5°, unless otherwise specified.

<1. Summary of Phase Difference Film According to First Embodiment>

The phase difference film according to the first embodiment of the present invention is formed of a resin containing a polymer having crystallizability. The coefficient of variation CV(Re) of the in-plane retardation of the phase difference film at a measurement wavelength of 590 nm is 1.0% or less.

It has been difficult to achieve such a phase difference film by prior-art technologies. Fluctuations in in-plane retardation of a film formed of a resin containing a polymer having crystallizability tended to be large, especially when optical anisotropy, represented by a retardation or a birefringence, is large, or when a crystallization progress level represented by a crystallization degree is large. Therefore, it has been particularly difficult to achieve the aforementioned phase difference film by prior-art technologies. However, the aforementioned phase difference film can be achieved for the first time by the present invention.

The phase difference film according to the first embodiment can exhibit enhanced uniformity in optical anisotropy even when the film exhibits a high degree of optical anisotropy. Therefore, a practically useful thin phase difference film having a desired retardation can be achieved. Although there has been a demand for a technical measure that solves the problems associated with thinning a phase difference film while maintaining a desired retardation, it has been difficult to concretize the technical measure. In an aspect, it can be said that the phase difference film according to the first embodiment is the first concretization of the aforementioned technical measure.

<2. Crystallizable Resin Contained in Phase Difference Film According to First Embodiment>

The phase difference film according to the first embodiment is formed of a resin containing a polymer having crystallizability. The "polymer having crystallizability" represents a polymer having a melting point Tm. In other words, the "polymer having crystallizability" represents a polymer of which the melting point can be observed by a differential scanning calorimeter (DSC). In the following description, a polymer having crystallizability may be referred to as a "crystallizable polymer". In addition, a resin containing a crystallizable polymer may be referred to as a "crystallizable resin". This crystallizable resin is preferably a thermoplastic resin.

The crystallizable polymer preferably has a positive intrinsic birefringence. A polymer which has a positive intrinsic birefringence means a polymer in which the refractive index in the stretching direction is larger than the refractive index in the direction perpendicular to the stretching direction, unless otherwise specified. The value of the intrinsic birefringence may be calculated from a permittivity distribution.

It is preferable that the crystallizable polymer contains an alicyclic structure. By using a crystallizable polymer containing an alicyclic structure, mechanical properties, heat resistance, transparency, low hygroscopicity, size stability, and light-weight properties of the phase difference film can be improved. A polymer containing an alicyclic structure represents a polymer having an alicyclic structure in a molecule. Such a polymer containing an alicyclic structure may be, for example, a polymer which can be obtained by a polymerization reaction using a cyclic olefin as a monomer or a hydrogenated product thereof.

Examples of the alicyclic structure may include a cycloalkane structure and a cycloalkene structure. Among these, a cycloalkane structure is preferable because a phase difference film with excellent characteristics such as thermal stability is easily obtained. The number of carbon atoms contained in one alicyclic structure is preferably 4 or more, and more preferably 5 or more, and is preferably 30 or less, more preferably 20 or less, and particularly preferably 15 or less. When the number of carbon atoms contained in one alicyclic structure falls within the aforementioned range, mechanical strength, heat resistance, and moldability are highly balanced.

In the crystallizable polymer containing an alicyclic structure, the ratio of the structural unit containing an alicyclic structure relative to all structural units is preferably 30% by weight or more, more preferably 50% by weight or more, and particularly preferably 70% by weight or more. By increasing the ratio of the structural unit containing an alicyclic structure as described above, heat resistance can be enhanced. The ratio of the structural unit containing an alicyclic structure relative to all structural units may be 100% by weight or less. In addition, in the crystallizable polymer containing an alicyclic structure, the remaining portion other than the structural unit containing an alicyclic structure is not particularly limited and may be appropriately selected depending on the intended use.

Examples of the crystallizable polymer containing an alicyclic structure may include the following polymer ($\alpha$) to polymer ($\delta$). Among these, the polymer ($\beta$) is preferable because a phase difference film having excellent heat resistance can be easily obtained.

Polymer ($\alpha$): a ring-opening polymer of a cyclic olefin monomer having crystallizability Polymer ($\beta$): a hydrogenated product of the polymer ($\alpha$) having crystallizability Polymer ($\gamma$): an addition polymer of a cyclic olefin monomer having crystallizability Polymer ($\delta$): a hydrogenated product of the polymer ($\gamma$) having crystallizability Specifically, the crystallizable polymer containing an alicyclic structure is preferably a ring-opening polymer of dicyclopentadiene having crystallizability and a hydrogenated product of a ring-opening polymer of dicyclopentadiene having crystallizability. Among these, a hydrogenated product of a ring-opening polymer of dicyclopentadiene having crystallizability is particularly preferable. Herein, the ring-opening polymer of dicyclopentadiene refers to a polymer in which the ratio of the structural unit derived from dicyclopentadiene relative to the all structural units is usually 50% by weight or more, preferably 70% by weight or more, more preferably 90% by weight or more, and still more preferably 100% by weight.

The hydrogenated product of the ring-opening polymer of dicyclopentadiene preferably has a high ratio of the racemo·diad. Specifically, the ratio of the racemo·diad of the repeating unit in the hydrogenated product of the ring-opening polymer of dicyclopentadiene is preferably 51% or more, more preferably 70% or more, and particularly preferably 85% or more. A high ratio of the racemo·diad indicates a high degree of syndiotactic stereoregularity. Therefore, the higher the ratio of the racemo·diad is, the higher the melting point of the hydrogenated product of the ring-opening polymer of dicyclopentadiene tends to be.

The ratio of the racemo·diad can be determined on the basis of $^{13}$C-NMR spectral analyses as described in the examples below.

The above-mentioned polymer ($\alpha$) to polymer ($\delta$) may be obtained by the production method disclosed in International Publication No. 2018/062067.

The melting point Tm of the crystallizable polymer is preferably 200° C. or higher, and more preferably 230° C. or higher, and is preferably 290° C. or lower. By using a crystallizable polymer having such a melting point Tm, it is possible to obtain a phase difference film with moldability and heat resistance which are balanced much better.

Usually, the crystallizable polymer has a glass transition temperature Tg. The specific glass transition temperature Tg of the crystallizable polymer is not particularly limited, and is usually 85° C. or higher and usually 170° C. or lower.

The glass transition temperature Tg and the melting point Tm of the polymer can be measured by the following method. First, the polymer is molten by heating, and the molten polymer is quickly cooled with dry ice. Subsequently, this polymer is used as a test material, and the glass transition temperature Tg and the melting point Tm of the polymer may be measured using a differential scanning calorimeter (DSC) at a temperature rise rate (temperature rise mode) of 10° C./min.

The weight-average molecular weight (Mw) of the crystallizable polymer is preferably 1,000 or more, and more preferably 2,000 or more, and is preferably 1,000,000 or less, and more preferably 500,000 or less. The crystallizable polymer having such a weight-average molecular weight has moldability and heat resistance that are well balanced.

The molecular weight distribution (Mw/Mn) of the crystallizable polymer is preferably 1.0 or more, and more preferably 1.5 or more, and is preferably 4.0 or less, and more preferably 3.5 or less. Herein, Mn represents a number-average molecular weight. The crystallizable polymer having such a molecular weight distribution has excellent moldability.

The weight-average molecular weight (Mw) and the molecular weight distribution (Mw/Mn) of the polymer may be measured as a polystyrene-equivalent value by gel permeation chromatography (GPC) using tetrahydrofuran as a developing solvent.

The crystallization degree of the crystallizable polymer contained in the phase difference film is not particularly limited, and is usually higher than a certain degree. The specific range of the crystallization degree is preferably 10% or more, more preferably 15% or more, and particularly preferably 30% or more.

The crystallization degree of the crystallizable polymer may be measured by an X-ray diffraction method.

As the crystallizable polymer, one type thereof may be solely used, and two or more types thereof may also be used in combination at any ratio.

The ratio of the crystallizable polymer in the crystallizable resin is preferably 50% by weight or more, more preferably 70% by weight or more, and particularly preferably 90% by weight or more. When the ratio of the crystallizable polymer is equal to or more than the lower limit value of the above-mentioned range, it is possible to enhance developability of the birefringence and heat resistance of the phase difference film. The upper limit of the ratio of the crystallizable polymer may be 100% by weight or less.

The crystallizable resin may include, in addition to the crystallizable polymer, optional components. Examples of the optional components may include an antioxidant such as a phenol-based antioxidant, a phosphorus-based antioxidant, and a sulfur-based antioxidant; a light stabilizer such as a hindered amine-based light stabilizer; a wax such as a petroleum-based wax, a Fischer-Tropsch wax, and a polyalkylene wax; a nucleating agent such as a sorbitol-based compound, a metal salt of an organophosphate, a metal salt of an organocarboxylic acid, kaolin and talc; a fluorescent brightener such as a diaminostilbene derivative, a coumarin derivative, an azole derivative (for example, a benzoxazole derivative, a benzotriazole derivative, a benzimidazole derivative, and a benzothiazole derivative), a carbazole derivative, a pyridine derivative, a naphthalic acid derivative, and an imidazolone derivative; an ultraviolet absorber such as a benzophenone-based ultraviolet absorber, a salicylic acid-based ultraviolet absorber, and a benzotriazole-based ultraviolet absorber; an inorganic filler such as talc, silica, calcium carbonate, and glass fiber; a colorant; a flame retardant; a flame retardant aid; an antistatic agent; a plasticizer; a near-infrared absorber; a lubricant; a filler; and an optional polymer other than the crystallizable polymer, such as a soft polymer. As the optional components, one type thereof may be solely used, and two or more types thereof may also be used in combination at any ratio.

<3. Optical Characteristics of Phase Difference Film According to First Embodiment>

In the phase difference film according to the first embodiment of the present invention, the coefficient of variation CV(Re) of the in-plane retardation Re at a measurement wavelength of 590 nm is within a specified range. Specifically, the aforementioned coefficient of variation CV(Re) of the in-plane retardation Re is usually 1.0% or less, preferably 0.8% or less, particularly preferably 0.5% or less, and ideally 0.0%. When the coefficient of variation CV(Re) of the in-plane retardation Re of the phase difference film is within the aforementioned specified range, it is signified that the in-plane retardation Re of the phase difference film is excellent in uniformity. When such a phase difference film is disposed to an image display device, the display quality of the screen of the image display device can be uniformized regardless of the positions on the screen.

A coefficient of variation expresses a percentage value of the standard deviation in reference to an average value. Specifically, the coefficient of variation CV(Re) of the in-plane retardation Re of the phase difference film may be calculated by dividing the standard deviation of the in-plane retardation Re of the phase difference film by the average value of the in-plane retardations Re and converting the obtained value into a percentage. The measurement methods of the average value and standard deviation of the in-plane retardations Re of the phase difference film will be described later.

The phase difference film usually has a large birefringence in at least one of the following directions, the in-plane direction and the thickness direction. Specifically, the phase difference film usually has at least one of the following values, an average value of birefringences in the in-plane direction of $1.0 \times 10^{-3}$ or more and an absolute value of an average value of birefringences in the thickness direction of $1.0 \times 10^{-3}$ or more.

In particular, the average value of the birefringences in the in-plane direction of the phase difference film is usually $1.0 \times 10^{-3}$ or more, preferably $5.0 \times 10^{-3}$ or more, and particularly preferably $15.0 \times 10^{-3}$ or more. The upper limit is not limited, and may be, for example, $50.0 \times 10^{-3}$ or less, $30.0 \times 10^{-3}$ or less, or $25.0 \times 10^{-3}$ or less. However, when the absolute value of the average value of the birefringences in the thickness direction of the phase difference film is $1.0 \times 10^{-3}$ or more, the average value of the birefringences in the in-plane direction of the phase difference film may be outside the aforementioned range.

The absolute value of the average value of the birefringences in the thickness direction of the phase difference film is usually $1.0 \times 10^{-3}$ or more, preferably $3.0 \times 10^{-3}$ or more, and particularly preferably $5.0 \times 10^{-3}$ or more. The upper limit is not limited, and may be, for example, $20.0 \times 10^{-3}$ or less, $15.0 \times 10^{-3}$ or less, or $10.0 \times 10^{-3}$ or less. However, when the average value of the birefringences in the in-plane direction of the phase difference film is $1.0 \times 10^{-3}$ or more, the absolute value of the average value of the birefringences in the thickness direction of the phase difference film may be outside the aforementioned range.

Although the phase difference film having the large birefringence could be obtained by subjecting a crystallizable resin film to a stretching treatment and further to a heating treatment, the birefringence tended to significantly fluctuate. In contrast, the phase difference film according to the first embodiment can usually reduce the fluctuations in the birefringence and achieve high uniformity, while achieving a large birefringence as previously described.

The degree of uniformity in the birefringence can be expressed by the standard deviation or the coefficient of variation.

The standard deviation of the birefringence in the in-plane direction of the phase difference film is preferably $0.10 \times 10^{-3}$ or less, more preferably $0.08 \times 10^{-3}$ or less, and particularly preferably $0.06 \times 10^{-3}$ or less. The coefficient of variation of the birefringence in the in-plane direction of the phase difference film is preferably 1.0% or less, more preferably 0.8% or less, particularly preferably 0.6% or less, and ideally 0%.

The standard deviation of the birefringence in the thickness direction of the phase difference film is preferably $0.10 \times 10^{-3}$ or less, more preferably $0.08 \times 10^{-3}$ or less, and particularly preferably $0.04 \times 10^{-3}$ or less. The absolute value of the coefficient of variation of the birefringence in the thickness direction of the phase difference film is preferably 1.0% or less, more preferably 0.9% or less, particularly preferably 0.8% or less, and ideally 0%.

The average value, standard deviation, and coefficient of variation of the birefringence of the phase difference film may be measured by the following method.

The phase difference film is partitioned into three in the longitudinal direction and three in the lateral direction to set nine measurement regions having the same area. In the center of each measurement region, the birefringence is measured. From the obtained nine measurement values, the average value and the standard deviation are calculated. Furthermore, the standard deviation is divided by the average value, and the obtained value is converted into a percentage to obtain a coefficient of variation.

Among the birefringences, the birefringence in the in-plane direction may be obtained by measuring the in-plane retardation using a phase difference meter (for example, "AxoScan OPMF-1" manufactured by Axometrics Inc.) and dividing the measured value by the thickness. The birefringence in the thickness direction may be obtained by measuring the thickness-direction retardation using a phase difference meter (for example, "AxoScan OPMF-1" manufactured by Axometrics Inc.) and dividing the measured value by the thickness.

The in-plane retardation Re of the phase difference film may be set to appropriate values according to use application of the phase difference film.

An average value of the specific in-plane retardations Re of the phase difference film may be, for example, preferably 100 nm or more, more preferably 110 nm or more, and particularly preferably 120 nm or more, and may be preferably 180 nm or less, more preferably 170 nm or less, and particularly preferably 160 nm or less. In this instance, the phase difference film can then serve as a quarter-wave plate.

Furthermore, an average value of the specific in-plane retardations Re of the phase difference film may be, for example, preferably 245 nm or more, more preferably 265 nm or more, and particularly preferably 270 nm or more, and may be preferably 320 nm or less, more preferably 300 nm or less, and particularly preferably 295 nm or less. In this instance, the phase difference film can then serve as a half-wave plate.

Since the phase difference film is excellent in the uniformity of the in-plane retardation Re, the standard deviation of the in-plane retardation Re can usually be reduced. Specifically, the standard deviation of the in-plane retardation Re of the phase difference film is preferably 4.0 nm or less, more preferably 3.0 nm or less, particularly preferably 2.0 nm or less, and ideally 0.0 nm.

The average value and standard deviation of the in-plane retardation Re of the phase difference film may be measured by the following method.

The phase difference film is partitioned into three in the longitudinal direction and three in the lateral direction to set nine measurement regions having the same area. In the center of each measurement region, the in-plane retardation Re is measured. From the obtained nine measurement values, the average value and the standard deviation are calculated. The in-plane retardation Re may be measured using a phase difference meter (for example, "AxoScan OPMF-1" manufactured by Axometrics Inc.).

The thickness-direction retardation Rth of the phase difference film may be set to appropriate values according to use application of the phase difference film. Specifically, an absolute value of an average value of the thickness-direction retardations Rth of the phase difference film may be preferably 50 nm or more, more preferably 55 nm or more, and particularly preferably 60 nm or more. The upper limit thereof may be 10,000 nm or less.

The phase difference film is usually excellent in the uniformity of the thickness-direction retardation Rth thereof. Thus, the standard deviation and coefficient of variation CV(Rth) of the thickness-direction retardation Rth of the phase difference film are preferably small. Specifically, the standard deviation of the thickness-direction retardation Rth of the phase difference film is preferably 2.5 nm or less, more preferably 2.0 nm or less, particularly preferably 1.5 nm or less, and ideally 0.0 nm. An absolute value of the coefficient of variation CV(Rth) of the thickness-direction retardation Rth of the phase difference film is preferably 1.0% or less, more preferably 0.9% or less, particularly preferably 0.8% or less, and ideally 0%.

The average value, standard deviation, and coefficient of variation of the thickness-direction retardation Rth of the phase difference film may be measured by the following method.

The phase difference film is partitioned into three in the longitudinal direction and three in the lateral direction to set nine measurement regions having the same area. In the center of each measurement region, the thickness-direction retardation Rth is measured. From the obtained nine measurement values, the average value and the standard deviation are calculated. Furthermore, the standard deviation is divided by the average value, and the obtained value is converted into a percentage to obtain a coefficient of variation. The thickness-direction retardation Rth may be measured using a phase difference meter (for example, "AxoScan OPMF-1" manufactured by Axometrics Inc.).

The value of the NZ factor of the phase difference film may be set to appropriate values according to use application of the phase difference film. An average value of the specific NZ factors of the phase difference film may be preferably more than 0.0, more preferably 0.5 or more, and particularly preferably 0.6 or more, and may be preferably less than 1.0. Since it had been difficult to produce a phase difference film which has an average value of the NZ factor of more than 0.0 and less than 1.0 by a prior-art technology, the phase difference film which has the average value of the NZ factor falling within the aforementioned range is beneficial for industrial application. The phase difference film which has the average value of the NZ factor falling within the aforementioned range, when used in a display device, can improve the display qualities such as the viewing angle, contrast, and image quality of the display device.

The phase difference film is usually excellent in the uniformity of the NZ factor. Thus, the coefficient of variation of the NZ factor of the phase difference film is preferably small. Specifically, the coefficient of variation of the NZ factor of the phase difference film is preferably 1.0% or less, more preferably 0.7% or less, particularly preferably 0.5% or less, and ideally 0.0%.

The average value and coefficient of variation of the NZ factor of the phase difference film may be measured by the following method.

The phase difference film is partitioned into three in the longitudinal direction and three in the lateral direction to set nine measurement regions having the same area. In the center of each measurement region, the in-plane retardation Re and the thickness-direction retardation Rth are measured. Then, an NZ factor is calculated in accordance with the equation "NZ factor=0.5+Rth/Re". From the obtained nine calculated values, the average value and the standard deviation are determined. Furthermore, the standard deviation is divided by the average value, and the obtained value is converted into a percentage to obtain a coefficient of variation. The in-plane retardation Re and the thickness-direction retardation Rth may be measured by the methods described above.

Since the phase difference film is an optical film, the phase difference film preferably has high transparency.

Specifically, the total light transmittance of the phase difference film is preferably 80% or more, more preferably 85% or more, and particularly preferably 88% or more. The total light transmittance of the phase difference film may be measured using an ultraviolet-visible spectrometer at wavelengths ranging from 400 nm to 700 nm.

The haze of the phase difference film is preferably less than 1.0%, more preferably less than 0.8%, particularly preferably less than 0.5%, and ideally 0.0%. The haze of the phase difference film may be measured using a haze meter (for example, "NDH5000" manufactured by Nippon Denshoku Industries Co., Ltd.).

<4. Organic Solvent that May be Contained in Phase Difference Film According to First Embodiment>

The phase difference film according to the first embodiment of the present invention may contain an organic solvent. This organic solvent is usually incorporated into the film in a second step of the production method described in a second embodiment.

All or a part of the organic solvent incorporated into the film in the second step may enter the interior of the polymer. Therefore, even if drying is carried out at or above the boiling point of the organic solvent, it is difficult to completely remove the solvent easily. Therefore, the phase difference film may contain an organic solvent.

As the organic solvent described above, those which do not dissolve the crystallizable polymer may be used. Preferable examples of the organic solvents may include a hydrocarbon solvent such as toluene, limonene, and decalin; and carbon disulfide. As the organic solvents, one type thereof may be solely used, and two or more types thereof may also be used.

The ratio (solvent containing rate) of the organic solvent contained in the phase difference film relative to 100% by weight of the phase difference film is preferably 10% by weight or less, more preferably 5% by weight or less, further preferably 4% by weight or less, and particularly preferably 0.1% by weight or less. The lower limit is preferably as close to zero as possible, and usually equal to or more than the detection limit. The lower limit is specifically preferably 0.01 ppm or more.

The solvent containing rate of the phase difference film can be measured by the measuring method described in the Examples.

<5. Thickness and Shape of Phase Difference Film According to First Embodiment>

The thickness d of the phase difference film according to the first embodiment of the present invention can be set to appropriate values according to use application of the phase difference film. Specifically, the thickness d of the phase difference film is preferably 5 μm or more, more preferably 10 μm or more, and particularly preferably 20 μm or more, and is preferably 200 μm or less, more preferably 100 μm or less, and particularly preferably 50 μm or less. When the thickness d of the phase difference film is equal to or more than the lower limit value of the above-mentioned range, handling performance can be improved and strength can be increased. When the thickness d of the phase difference film is equal to or less than the upper limit value, winding of a long-length phase difference film is facilitated.

The phase difference film may be a film in a sheet piece shape, and may be a long-length film.

<6. Method for Producing Phase Difference Film According to First Embodiment>

The phase difference film according to the first embodiment described above can be produced by the production method described in the second embodiment, which will be described later.

<7. Method for Producing Phase Difference Film According to Second Embodiment>

The method for producing a phase difference film according to the second embodiment of the present invention includes: a first step of preparing a stretched film formed of a crystallizable resin containing a crystallizable polymer; and a second step of bringing this stretched film into contact with an organic solvent. In this production method, usually, by bringing the stretched film into contact with an organic solvent in the second step, the birefringence of the stretched film is changed to obtain the phase different film that has desired optical characteristics.

In this production method, tension is applied to the stretched film in the second step. When the stretched film, while tension is applied in this manner, comes into contact with the organic solvent, a phase difference film having a small coefficient of variation CV(Re) of an in-plane retardation can be easily produced.

The present inventor assumes that a phase difference film having a small coefficient of variation CV(Re) of an in-plane retardation can be obtained by this production method based on the following mechanism. However, the following mechanism does not limit the technical scope of the present invention.

Molecules of a crystallizable polymer contained in a stretched film formed of a crystallizable resin are oriented to a degree that corresponds to the stretching conditions. Since stretching is usually performed in an in-plane direction that is perpendicular to the thickness direction of a film, a majority of the molecules of the crystallizable polymer may be oriented in the in-plane direction of the stretched film. When the stretched film containing the oriented molecules of the crystallizable polymer is brought into contact with an organic solvent in the second step, the organic solvent infiltrates the stretched film. By the action of the infiltrating organic solvent, micro-Brownian motion of the molecules of the crystallizable polymer in the film occurs. This further promotes the orientation of the molecules in the film and increases the degree of orientation. According to the study of the present inventor, it is considered that when orientation of molecules progresses, a solvent induced crystallization phenomenon of a crystallizable polymer may occur. When the degree of orientation of molecules increases in this manner, the birefringence of the film may change, and thus the retardation may also change. Usually, the change in retardation proceeds such that the in-plane retardation Re increases.

However, since movement of the molecules of the crystallizable polymer may occur when the orientation of molecules progresses, stress may be generated in the film. Such stress may be easily generated in an uneven manner in the film. When such unevenness in stress exists, the uneven stress influences the orientation state of the molecules of the crystallizable polymer, and may thereby cause fluctuations in the orientation state. In contrast, when tension is applied to the film as performed in the second step of the production method according to the second embodiment, the influence by the uneven stress can be reduced. Thus the fluctuations in the orientation state caused by the contact with the organic solvent can be reduced. Therefore, the uniformity in the optical characteristics of the obtained phase difference film can be enhanced, and thus the coefficient of variation CV(Re) of the in-plane retardation can be reduced.

It is noted that the surface area of a stretched film is generally larger on the front and back surfaces, which are major surfaces thereof. Therefore, the infiltration speed of the organic solvent is higher in the thickness direction which extends through the aforementioned front and back surfaces. Accordingly, a part of the aforementioned molecules of the crystallizable polymer may be oriented in the thickness direction due to the entering organic solvent. Since this orientation increases the refractive index nz in the thickness direction of the film, the average value of the NZ factor of the phase difference film may fall within the range of more than 0.0 and less than 1.0.

The production method according to the second embodiment of the present invention can be particularly useful when using a stretched film having a small birefringence. Also, since a phase difference film that is produced with a stretched film having a small birefringence generally has a small retardation or birefringence, the production method according to the second embodiment of the present invention can be particularly useful when producing a phase difference film having a small retardation or birefringence. According to the study of the present inventor, a problem was found in that the smaller the birefringence of a stretched film formed of a crystallizable resin was, the larger the fluctuations in the birefringence of the stretched film caused by the contact with an organic solvent would be, and as a result, the lower the uniformity in the optical characteristics of the obtained phase difference film would likely be. In contrast, the uniformity in the optical characteristics of the obtained phase difference film can be enhanced in the aforementioned second embodiment, even when using a stretched film having a small birefringence. When using a stretched film having a small birefringence or producing a phase difference film having a small retardation or birefringence in this manner, the production method according to the second embodiment of the present invention is of significant impact in that the conventionally unknown new problem can be solved.

The present inventor assumes that the mechanism by which such a new problem can be solved is as follows. However, the technical scope of the present invention is not limited by the following mechanism.

In general, when a stretched film has a large birefringence, the degree of orientation of the molecules of the crystallizable polymer contained in the stretched film is large. With such a high degree of orientation, the range in which the molecules can move for proceeding orientation of the molecules is restricted when the orientation is proceeded by the contact with an organic solvent. Therefore, the range of change in the orientation state is narrow. Consequently, the flexibility of change in the orientation state of each molecule caused by the contact with an organic solvent is relatively small, and the result is that the fluctuations in the orientation state is small, and the fluctuations in birefringence can be relatively small.

However, when a stretched film has a small birefringence, the degree of orientation of the molecules of the crystallizable polymer contained in the stretched film is generally low. With such a low degree of orientation, the range in which the molecules can move for proceeding orientation of the molecules is wide when the orientation is proceeded by the contact with an organic solvent. Therefore, the range of change in the orientation state is wide. Consequently, the flexibility of change in the orientation state of each molecule caused by the contact with an organic solvent is relatively large, and the result is that the fluctuations in the orientation state is large, and the fluctuations in birefringence can be relatively large.

Therefore, when tension is not applied during contact between the organic solvent and the stretched film, the smaller the birefringence of the stretched film was, the lower the uniformity in the optical characteristics of the obtained phase difference film tended to be. This tendency may be the same in the method of subjecting a stretched film to a heating treatment to produce a phase difference film having a large retardation.

In contrast, when the film is brought into contact with the organic solvent while the film is applied with tension, as performed in the second step of the production method according to the second embodiment, the flexibility of the change in the orientation state of each molecule caused by the contact with an organic solvent can be effectively reduced by the tension. Consequently, even when using a stretched film having a small birefringence or producing a phase difference film having a small retardation or birefringence, a phase difference film having high uniformity in optical characteristics can be produced according to the production method of the second embodiment.

The method for producing a phase difference film according to the second embodiment of the present invention may further include an optional step in combination with the aforementioned first and second steps. For example, the method for producing a phase difference film may include a third step of drying the obtained phase difference film after the second step.

<8. First Step: Preparation of Stretched Film>

In the first step, a stretched film formed of a crystallizable resin containing a crystallizable polymer is prepared. There is no limitation on preparing such a stretched film. For example, the first step may include a step of preparing a resin film formed of a crystallizable resin; and a step of stretching this resin film to obtain a stretched film. In the following description, a resin film before being stretched may be appropriately referred to as a "pre-stretch film".

The crystallizable resin as a material of the pre-stretch film and the stretched film may be the same as the crystallizable resin described in the first embodiment. However, the crystallization degree of the crystallizable polymer contained in the pre-stretch film and the stretched film is preferably low. The specific crystallization degree is preferably less than 10%, more preferably less than 5%, and particularly preferably less than 3%. When the crystallization degree of the crystallizable polymer contained in the pre-stretch film and the stretched film before the contact with the organic solvent is low, orientation of many molecules of the crystallizable polymer can progress due to the contact with the organic solvent. This enables the adjustment of the birefringence and retardation across wide ranges.

There is no limitation on the method for producing the pre-stretch film from the crystallizable resin. As a method for producing the pre-stretch film, a resin molding method such as an injection molding method, an extrusion molding method, a press molding method, an inflation molding method, a blow molding method, a calendar molding method, a cast molding method, or a compression molding method is preferable because the pre-stretch film containing no organic solvent is obtained. Among these, an extrusion molding method is preferable because the thickness can be easily controlled.

The production conditions in the extrusion molding method are preferably as follows: The cylinder temperature (molten resin temperature) is preferably Tm or higher, and more preferably "Tm+20° C." or higher, and is preferably "Tm+100° C." or lower, and more preferably "Tm+50° C." or lower. In addition, there is no particular limitation on a cooling body with which the molten resin extruded into a film form is first brought into contact, and a cast roll is usually used. The temperature of this cast roll is preferably "Tg−50° C." or higher, and preferably "Tg+70° C." or lower, and more preferably "Tg+40° C." or lower. Further, the temperature of the cooling roll is preferably "Tg−70° C." or higher, and more preferably "Tg−50° C." or higher, and is preferably "Tg+60° C." or lower, and more preferably "Tg+30° C." or lower. When a pre-stretch film is produced under such conditions, the pre-stretch film having a thickness of 1 μm to 1 mm can be easily produced. Herein, "Tm" represents a melting point of a crystallizable polymer, and "Tg" represents a glass transition temperature of a crystallizable polymer.

The first step may include a step of performing a preheat treatment for heating the pre-stretch film to a stretching temperature after preparing the pre-stretch film and before stretching the pre-stretch film. Usually, the preheating temperature is the same as the stretching temperature, and may not be the same. The preheating temperature is preferably Tl−10° C. or higher, and more preferably Tl−5° C. or higher, and is preferably Tl+5° C. or lower, and is more preferably Tl+2° C. or lower where Tl represents the stretching temperature. The preheating time is freely set and is preferably 1 second or longer, and more preferably 5 seconds or longer, and is preferably 60 seconds or shorter, and more preferably 30 seconds or shorter.

After preparing a pre-stretch film and performing a pre-heating treatment as necessary, the first step may include stretching the pre-stretch film. In general, by the stretching, molecules of the crystallizable polymer contained in the pre-stretch film can be oriented in a direction corresponding to the stretching direction, so that the stretched film can be obtained.

The stretching direction is not particularly limited. Examples of the stretching direction may include a lengthwise direction, a width direction, and an oblique direction. Herein, the oblique direction is a direction perpendicular to the thickness direction and represents a direction that is neither perpendicular nor parallel to the width direction. The stretching direction may be a single direction or two or more directions. Thus, examples of the stretching method may include: a uniaxial stretching method such as a method of uniaxially stretching a pre-stretch film in the lengthwise direction (longitudinal uniaxial stretching method) and a method of uniaxially stretching a pre-stretch film in the width direction (transverse uniaxial stretching method); a biaxial stretching method such as a simultaneous biaxial stretching method in which a pre-stretch film is stretched in the width direction while simultaneously stretched in the lengthwise direction, and a successive biaxial stretching method in which a pre-stretch film is stretched in either the lengthwise direction or the width direction and then stretched in the other direction; and a method of stretching a pre-stretch film in an oblique direction (oblique stretching method).

The stretching ratio is preferably 1.1 times or more, and more preferably 1.2 times or more, and is preferably 20.0 times or less, more preferably 10.0 times or less, still more preferably 5.0 times or less, and particularly preferably 2.0 times or less. The specific stretching ratio is desirably set to appropriate values in accordance with factors such as optical characteristics, thickness, and strength of the phase difference film to be produced. When the stretching ratio is equal to or more than the lower limit value of the above-mentioned range, birefringence can be greatly changed by the stretching. When the stretching ratio is equal to or less than the upper limit value of the above-mentioned range, the direction of the slow axis can be easily controlled, and breakage of the film can be effectively suppressed.

The stretching temperature is preferably "Tg+5° C." or higher, and more preferably "Tg+10° C." or higher, and is preferably "Tg+100° C." or lower, and more preferably "Tg+90° C." or lower. Herein, "Tg" represents a glass transition temperature of a crystallizable polymer. When the stretching temperature is equal to or more than the lower limit value of the above-mentioned range, the crystallizable resin can be sufficiently softened to allow uniform stretching. Further, when the stretching temperature is equal to or less than the upper limit value of the above-mentioned range, curing of the crystallizable resin due to progress of crystallization of the crystallizable polymer can be suppressed, so that the stretching can be smoothly performed and a large birefringence can be developed by the stretching. Furthermore, it is usually possible to reduce the haze of the obtained stretched film to enhance transparency.

The optical characteristics of the obtained stretched film are preferably set in accordance with the optical characteristics of the phase difference film to be produced, so as to obtain the phase difference film which has the desired optical characteristics.

For example, the average value of the in-plane retardation Re of the stretched film may be preferably 10 nm or more, more preferably 20 nm or more, and particularly preferably 30 nm or more, and may be preferably 150 nm or less, more preferably 140 nm or less, and particularly preferably 130 nm or less.

For example, the absolute value of the average value of the thickness-direction retardation Rth of the stretched film may be preferably 10 nm or more, more preferably 20 nm or more, and particularly preferably 30 nm or more, and may be preferably 150 nm or less, more preferably 140 nm or less, and particularly preferably 130 nm or less.

For example, the average value of the birefringence in the in-plane direction of the stretched film is preferably $1.0 \times 10^{-3}$ or more, more preferably $1.3 \times 10^{-3}$ or more, and particularly preferably $1.5 \times 10^{-3}$ or more, and is preferably $10.0 \times 10^{-3}$ or less, more preferably $8.0 \times 10^{-3}$ or less, and particularly preferably $5.0 \times 10^{-3}$ or less.

For example, the absolute value of the average value of the birefringence in the thickness direction of the stretched film is preferably $1.0 \times 10^{-3}$ or more, more preferably $1.3 \times 10^{-3}$ or more, and particularly preferably $1.5 \times 10^{-3}$ or more, and is preferably $10.0 \times 10^{-3}$ or less, more preferably $8.0 \times 10^{-3}$ or less, and particularly preferably $5.0 \times 10^{-3}$ or less.

For the stretched film, the average values of the in-plane retardation Re, thickness-direction retardation Rth, birefringence in the in-plane direction, and birefringence in the thickness direction may be measured by the following method.

The stretched film is partitioned into three in the longitudinal direction and three in the lateral direction to set nine measurement regions having the same area. In the center of each measurement region, the in-plane retardation Re, thickness-direction retardation Rth, birefringence in the in-plane direction, and birefringence in the thickness direction are measured. From the obtained measurement values, the average values are calculated. The in-plane retardation Re, the thickness-direction retardation Rth, birefringence in the in-plane direction, and birefringence in the thickness direction may be measured by the aforementioned method.

The amount of the organic solvent contained in the stretched film is preferably small. More preferably, the stretched film does not contain the organic solvent. The ratio (solvent containing ratio) of the organic solvent contained in the stretched film relative to 100% by weight of the stretched film is preferably 1.0% or less, more preferably 0.5% or less, particularly preferably 0.1% or less, and ideally 0.0%. When the amount of the organic solvent contained in the stretched film, serving as a film before the contact with the organic solvent, is small, the orientation of many molecules of the crystallizable polymer can be allowed to progress due to the contact with the organic solvent. This enables the adjustment of the birefringence and retardation across wide ranges.

The solvent containing rate of the stretched film may be determined on the basis of the density.

The haze of the stretched film is preferably less than 1.0%, preferably less than 0.8%, more preferably less than 0.5%, and ideally 0.0%. The smaller the haze of the stretched film is, the more easily the haze of the obtained phase difference film can be made smaller.

The thickness of the stretched film is preferably set to appropriate values according to the target thickness of the phase difference film to be produced. The thickness is usually increased by allowing the stretched film to be brought into contact with an organic solvent in the second step. Therefore, the thickness of the stretched film may be set to appropriate values in consideration of the change in thickness in the second and subsequent steps as described above.

The stretched film may be a film in a sheet piece shape, but is preferably a long-length film. The use of the long-length stretched films allows for the continuous production of phase difference film by a roll-to-roll method, thereby effectively increasing the productivity of phase difference film.

<9. Second Step: Contact Between Stretched Film and Organic Solvent>

In the second step, the stretched film prepared in the first step is brought into contact with an organic solvent. This can adjust the optical characteristics of the stretched film to obtain a phase difference film which has desired optical characteristics.

As the organic solvent, a solvent capable of infiltrating the stretched film without causing dissolution of the crystallizable polymer contained in the stretched film can be used. Examples thereof may include: a hydrocarbon solvent such as toluene, limonene, and decalin; and carbon disulfide. As the organic solvents, one type thereof may be solely used, and two or more types thereof may also be used.

Examples of the contact method for the stretched film and the organic solvent may include: a spraying method whereby the organic solvent is sprayed onto the stretched film; a coating method whereby the stretched film is coated with the organic solvent; and an immersion method whereby the stretched film is immersed in the organic solvent. Among these, an immersion method, which facilitates continuous contact, is preferable.

The temperature of the organic solvent to be brought into contact with the stretched film is optionally set to temperatures within the range that the organic solvent can be maintained in a liquid state, and therefore may be set to temperatures within the range of not lower than the melting point and not higher than the boiling point of the organic solvent.

The time during which the stretched film and the organic solvent are in contact with each other is not particularly specified, but is preferably 0.5 second or longer, more preferably 1.0 second or longer, and particularly preferably 5.0 seconds or longer, and is preferably 120 seconds or shorter, more preferably 80 seconds or shorter, and particularly preferably 60 seconds or shorter. When the contact time is equal to or longer than the lower limit value of the aforementioned range, the adjustment of the birefringence and retardation by the contact with the organic solvent can be effectively performed. On the other hand, the adjustment amount of the birefringence and retardation tends not to significantly change even when the immersion time is extended. Therefore, when the contact time is equal to or shorter than the upper limit value of the aforementioned range, the productivity of the phase difference film can be increased without impairing the qualities of the phase difference film.

The second step is performed while tension is applied to the stretched film. The organic solvent and the stretched film are brought into contact with each other while tension is applied to the stretched film, so that the uniformity in the optical characteristics of the obtained phase difference film can be enhanced, and the coefficient of variation CV(Re) of the in-plane retardation Re can be reduced.

The magnitude of tension applied to the stretched film in the second step is preferably set in the range that the stretched film is not substantially stretched by the tension. The "substantially stretched" indicates that the stretching ratio in either direction of the film is usually equal to or more than 1.1 times. Specifically, the tension is preferably 5 N/m or more, more preferably 10 N/m or more, and particularly preferably 15 N/m or more, and is preferably 200 N/m or less, more preferably 150 N/m or less, and particularly preferably 100 N/m or less. The aforementioned unit "N/m" of tension indicates the magnitude of tension per 1 m of a film in a direction perpendicular to the tensile direction.

The number of tensile directions as directions in which tension is applied to the stretched film may be one or more. Usually, tension is applied in the in-plane directions that are perpendicular to the thickness direction of the stretched film. Therefore, the tensile direction may be one or two or more in-plane directions. For example, when a stretched film is a film in a sheet piece shape, the tensile direction may be one or both of the longitudinal direction and the lateral direction of the film. Also, for example, when the stretched film is a long-length film, the tensile direction may be one or both of the lengthwise direction and the width direction of the film. Among these, the number of tensile directions is preferably one from the viewpoint of effectively enhancing uniformity in the optical characteristics of the phase difference film and reducing the coefficient of variation CV(Re) of the in-plane retardation Re.

When tension is applied to the stretched film as previously described, tension may be applied by, for example, holding the stretched film with appropriate holders and pulling the stretched film between the holders. The holders may continuously hold the entire length of the edge of the stretched film or may intermittently hold the film with spaces therebetween. For example, holders spaced apart at certain intervals may intermittently hold the edge of the stretched film.

Tension is preferably applied to the stretched film while holding at least two edges of the stretched film. In this case, tension is applied to a region between the held edges of the stretched film, so that the uniformity in the optical characteristics of the phase difference film can be enhanced. For enhancing the uniformity in optical characteristics in a wide area, it is preferable to hold edges including two opposing edges of the stretched film and apply tension to a region between the held edges. For example, for a rectangular stretched film in a sheet piece shape, two opposing edges (for example, a pair of long edges or a pair of short edges) are held to apply tension to a region between the aforementioned two edges, so that uniformity in optical characteristics can be enhanced on the entire region of a phase difference film obtained from the stretched film. Also, for a long-length stretched film, two edges (that is, long edges) on the ends in the width direction are held to apply tension to a region between the aforementioned two edges, so that uniformity in optical characteristics can be enhanced across the entire region of a phase difference film obtained from the stretched film.

The holders are preferably configured so as not to come into contact with a region other than the edges of the stretched film. With such holders, there can be obtained a phase difference film having further excellent surface smoothness.

Also, the holders preferably have fixed positions relative to each other during the length of time in which they hold the stretched film. Since such holders do not move relative to each other in position, substantial stretching of the stretched film is easily suppressed.

An example of holders suitable for a rectangular stretched film may include grippers such as clips that are disposed at certain intervals to a frame and can hold a stretched film.

Also, an example of holders for holding two edges on the ends in the width direction of a long-length stretched film may include grippers that are disposed to a tenter stretching machine and can hold a stretched film.

When using a long-length stretched film, edges (that is, short edges) on the ends in the lengthwise direction of the stretched film may be held, but both sides in the lengthwise direction of a region of the stretched film to be subjected to the second step may be held instead of holding the aforementioned edges. For example, a holding device capable of holding a stretched film to apply tension may be disposed on both sides in the lengthwise direction of a region of the stretched film to be subjected to the second step. An example of such a holding device may include a combination of two rolls. When tension such as conveyance tension is applied to a stretched film by the aforementioned combination, uniformity in optical characteristics can be enhanced in a region to be subjected to the second step. Therefore, when the aforementioned combination is used as the holding device, the stretched film can be held while the stretched film is conveyed along the lengthwise direction. This enables an efficient production of a phase difference film.

The contact with the organic solvent in the second step changes the optical characteristics such as the in-plane retardation Re, thickness-direction retardation Rth, birefringence in the in-plane direction, and birefringence in the thickness direction of the stretched film. Thus, between the optical characteristics of the stretched film which is the film before the contact with the organic solvent and the optical characteristics of the phase difference film which is the film after the contact with the organic solvent, there may be a difference based on the amount of change described above.

For example, the amount of change of the in-plane retardation Re caused by the contact with the organic solvent may be represented by the difference between the average value of the in-plane retardations Re of the stretched film and the average value of the in-plane retardations Re of the phase difference film. A specific range of the difference may be preferably 50 nm or more, more preferably 100 nm or more, and particularly preferably 150 nm or more, and may be preferably 1,000 nm or less, more preferably 800 nm or less, and particularly preferably 500 nm or less.

For example, the amount of change of the thickness-direction retardation Rth caused by the contact with the organic solvent may be represented by the difference between the average value of the thickness-direction retardations Rth of the stretched film and the average value of the thickness-direction retardations Rth of the phase difference film. A specific range of the difference may be preferably 10 nm or more, more preferably 30 nm or more, and particularly preferably 50 nm or more, and may be preferably 1,000 nm or less, more preferably 500 nm or less, and particularly preferably 300 nm or less.

For example, the amount of change of the birefringence in the in-plane direction caused by the contact with the organic solvent may be represented by the difference between the average value of the birefringences in the in-plane direction of the stretched film and the average value of the birefringences in the in-plane direction of the phase difference film. A specific range of the difference may be preferably $1 \times 10^{-3}$ or more, more preferably $3 \times 10^{-3}$ or more, and particularly preferably $5 \times 10^{-3}$ or more, and may be preferably $50 \times 10^{-3}$ or less, more preferably $40 \times 10^{-3}$ or less, and particularly preferably $30 \times 10^{-3}$ or less.

For example, the amount of change of the birefringence in the thickness direction caused by the contact with the organic solvent may be represented by the difference between the average value of the birefringences in the thickness direction of the stretched film and the average value of the birefringences in the thickness direction of the phase difference film. A specific range of the difference may be preferably $0.2 \times 10^{-3}$ or more, more preferably $0.6 \times 10^{-3}$ or more, and particularly preferably $1.0 \times 10^{-3}$ or more, and may be preferably $50 \times 10^{-3}$ or less, more preferably $40 \times 10^{-3}$ or less, and particularly preferably $30 \times 10^{-3}$ or less.

When the organic solvent in contact with the stretched film infiltrates the stretched film, the thickness of the film may increase in the second step. The lower limit of the change rate in the thickness at this time may be, for example, 10% or more, 20% or more, or 30% or more. The upper limit of the change rate in the thickness may be, for example, 80% or less, 50% or less, or 40% or less. The aforementioned change rate in the thickness is a ratio obtained by dividing a difference between the thickness of the phase difference film and the thickness of the stretched film by the thickness of the stretched film.

As described above, by adjusting the optical characteristics of the stretched film in the second step to have high uniformity, there can be obtained a phase difference film which has desired optical characteristics. The thus obtained phase difference films may be used as they are or may further be subjected to optional steps.

<10. Optional Steps>

The method for producing a phase difference film according to the second embodiment may further include optional steps in combination with the steps described above.

The method for producing a phase difference film may include, for example, a step of removing an organic solvent adhering to the phase difference film after the second step. Examples of the method of removing the organic solvent may include drying and wiping. Among these, it is preferable to perform drying from the viewpoint of promptly removing the organic solvent to obtain a phase difference film which has stable characteristics.

From the viewpoint of promptly performing drying, the drying temperature is preferably 50° C. or higher, more preferably 60° C. or higher, and particularly preferably 80° C. or higher. From the viewpoint of suppressing the relaxation of orientation due to heat to maintain the uniformity of the optical characteristics, the drying temperature is preferably Tg+100° C. or lower, more preferably Tg+80° C. or lower, and particularly preferably Tg+50° C. or lower. Herein, "Tg" represents a glass transition temperature of a crystallizable polymer.

From the viewpoint of removing the organic solvent from the phase difference film sufficiently, the drying time is preferably 5 minutes or longer, more preferably 10 minutes or longer, and particularly preferably 30 minutes or longer. From the viewpoint of reducing the time required for producing the phase difference film to improve the production efficiency, the drying time is preferably 5 hours or shorter, more preferably 3 hours or shorter, and particularly preferably 2 hours or shorter.

During the aforementioned drying, it is preferable to apply tension to the phase difference film. When the drying is performed while tension is applied, the uniformity in the optical characteristics of the phase difference film can be effectively enhanced. The range of the magnitude of tension applied to the phase difference film when drying may be the same as the range of the magnitude of tension applied to the stretched film in the second step. The number of directions in which tension is applied to the phase difference film may be the same as the number of directions in which tension is applied to the stretched film in the second step, and may be one or more.

For applying tension to the phase difference film when drying, tension may be applied by, for example, holding a phase difference film with appropriate holders and pulling the phase difference film between the holders. An example of the holders may be the same as the aforementioned holders which may be used for applying tension to the stretched film in the second step. From the viewpoint of reducing the frequency of attaching and detaching of the holders to achieve an efficient production of the phase difference film, it is preferable to dry the phase difference film which maintains the state of being applied with tension by the holders and thereafter remove the holders from the phase difference film, without detaching the holders after the second step.

According to the aforementioned production method, a long-length phase difference film can be produced with a long-length stretched film. The method for producing the phase difference film may include a step of winding up the thus produced long-length phase difference film into a roll shape. Furthermore, the method for producing the phase difference film may include a step of cutting the long-length phase difference film into a desired shape.

<11. Phase Difference Film Produced by Production Method According to Second Embodiment>

According to the production method of the second embodiment, by an easy step of bringing a stretched film into contact with an organic solvent while the stretched film is applied with tension, optical characteristics of the stretched film can be adjusted with high uniformity. Therefore, a phase difference film having excellent uniformity in optical characteristics can be easily produced, and, for example, a phase difference film having a coefficient of variation CV(Re) of an in-plane retardation Re of 1.0% or less can be easily obtained.

Since the contact between the stretched film and the organic solvent can adjust the optical characteristics of the stretched film across wide ranges, there can be produced a phase difference film having large optically anisotropy which has been difficult to achieve. For example, there can be produced a phase difference film having large parameters such as average values of in-plane retardation, thickness-direction retardation, birefringence in the in-plane direction, and birefringence in the thickness direction, which represent optical anisotropy.

In particular, the coefficient of variation CV(Re) of the in-plane retardation Re of the phase difference film produced by the production method according to the second embodiment may be the same as the coefficient of variation CV(Re) of the in-plane retardation Re of the phase difference film according to the first embodiment. Furthermore, characteristics other than the coefficient of variation CV(Re) of the in-plane retardation Re of the phase difference film produced by the production method according to the second embodiment may be the same as those of the phase difference film according to the first embodiment. Therefore, the phase difference film produced by the production method according to the second embodiment may be the same as the phase difference film according to the first embodiment of the present invention, in terms of characteristics such as: the crystallizable resin contained in the phase difference film; the average value, standard deviation, and coefficient of variation for the birefringence in the in-plane direction of the phase difference film; the absolute value of the average value, the standard deviation, and the absolute value of the coefficient of variation for the birefringence in the thickness direction of the phase difference film; the average value and standard deviation of the in-plane retardation Re of the phase difference film; the absolute value of the average value, the standard deviation, and the absolute value of the coefficient of variation CV(Rth) for the thickness-direction retardation Rth of the phase difference film; the average value and coefficient of variation of the NZ factor of the phase difference film; the total light transmittance and haze of the phase difference film; the amount of the organic solvent contained in the phase difference film; and the thickness of the phase difference film.

<12. Use Application>

The phase difference film according to the first embodiment and the phase difference film produced by the production method according to the second embodiment described above may be provided to, for example, a display device. In this case, the phase difference film can improve uniformity of display qualities such as the viewing angle, contrast, and quality of an image displayed on the display device.

EXAMPLE

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, unless otherwise specified. In the following description, the measurement wavelength of retardation and birefringence is 590 nm unless otherwise specified.

<Evaluation Method>

(Measurement Method of Weight-Average Molecular Weight Mw and Number-Average Molecular Weight Mn of Polymer)

The weight-average molecular weight Mw and the number-average molecular weight Mn of a polymer were measured as a polystyrene-equivalent value, using a gel permeation chromatography (GPC) system ("HLC-8320" manufactured by Tosoh Corporation). In the measurement, an H type column (manufactured by Tosoh Corporation) was used as a column, and tetrahydrofuran was used as a solvent. The temperature during the measurement was 40° C.

(Measurement Method of Hydrogenation Rate of Polymer)

The hydrogenation rate of the polymer was measured by $^1$H-NMR measurement with ortho-dichlorobenzene-$d_4$ as a solvent, at 145° C.

(Measurement Method of Glass Transition Temperature Tg and Melting Point Tm)

The glass transition temperature Tg and the melting point Tm of a polymer were measured as follows. First, the polymer was molten by heating, and the molten polymer was quickly cooled with dry ice. Subsequently, this polymer was used as a test material, and the glass transition temperature Tg and the melting point Tm of this polymer were measured using a differential scanning calorimeter (DSC) at a temperature rise rate (temperature rise mode) of 10° C./min.

(Measurement Method of Racemo·Diad Ratio of Polymer)

The racemo·diad ratio of a polymer was measured as follows. The $^{13}$C-NMR measurement of the polymer was performed with ortho-dichlorobenzene-$d_4$ as a solvent, at 200° C., by adopting an inverse-gated decoupling method.

In the result of this $^{13}$C-NMR measurement, a signal at 43.35 ppm attributable to a mesodiad and a signal at 43.43 ppm attributable to a racemo·diad were identified with a peak at 127.5 ppm of ortho-dichlorobenzene-d$_4$ as a reference shift. Based on the intensity ratio of these signals, the racemo·diad ratio of the polymer was calculated.

(Measurement Method of Thickness of Film)

The thickness of a film was measured using a contact thickness meter (Code No. 543-390 manufactured by Mitutoyo Corporation).

(Measurement Method of Solvent Containing Rate of Phase Difference Film)

A rectangular stretched film (film before contact with a solvent) was produced by the same method as those of Examples and Comparative Examples. This stretched film was cut into a rectangle with the same size as a phase difference film to obtain a reference film. The weight of this reference film was measured by thermal gravimetric analysis (TGA: nitrogen atmosphere, temperature rise rate: 10° C./min, 30° C. to 300° C.). The weight reduction amount $\Delta W_O$ of the reference film at 300° C. was obtained by subtracting the weight $W_O(300° C.)$ of the reference film at 300° C. from the weight $W_O(30° C.)$ of the reference film at 30° C. This reference film, which was stretched after produced by a melt extrusion method, does not contain a solvent. Therefore, the weight reduction amount $\Delta W_O$ of this reference film was adopted as a reference in the later-described formula (X).

Also, for a phase difference film as a sample, the weight was measured by thermal gravimetric analysis (TGA: under nitrogen atmosphere, with temperature rise rate of 10° C./min, at 30° C. to 300° C.) in the same manner as described above. The weight reduction amount $\Delta W_R$ of the phase difference film at 300° C. was obtained by subtracting the weight $W_R(300° C.)$ of the phase difference film at 300° C. from the weight $W_R(30° C.)$ of the phase difference film at 30° C.

From the weight reduction amount $\Delta W_0$ of the reference film at 300° C. and the weight reduction amount $\Delta W_R$ of the phase difference film at 300° C. described above, the solvent containing rate of the phase difference film was calculated according to the following formula (X).

$$\text{Solvent containing rate (\%)} = \{(\Delta W_R - \Delta W_O)/W_R(30° C.)\} \times 100 \quad (X)$$

Production Example 1. Production of Crystallizable Resin Containing Hydrogenated Product of Ring-Opening Polymer of Dicyclopentadiene A metal pressure resistant reaction vessel was sufficiently dried, and thereafter, the inside air was substituted with nitrogen. Into this metal pressure resistant reaction vessel, 154.5 parts of cyclohexane, 42.8 parts (30 parts as the amount of dicyclopentadiene) of a cyclohexane solution of dicyclopentadiene (endo-isomer containing rate: 99% or more) with a 70% concentration, and 1.9 parts of 1-hexene were added. The mixture was heated to 53° C.

0.014 part of a tetrachlorotungsten phenylimide (tetrahydrofuran) complex was dissolved in 0.70 part of toluene to prepare a solution. To this solution, 0.061 part of a n-hexane solution of diethylaluminum ethoxide with a 19% concentration was added. The mixture was stirred for 10 minutes to prepare a catalyst solution. This catalyst solution was added into the pressure resistant reaction vessel to initiate a ring-opening polymerization reaction. After that, the reaction was continued at 53° C. for 4 hours to obtain a solution of a ring-opening polymer of dicyclopentadiene. The number-average molecular weight (Mn) and the weight-average molecular weight (Mw) of the obtained ring-opening polymer of dicyclopentadiene were 8,750 and 28,100, respectively, and the molecular weight distribution (Mw/Mn) calculated from the obtained values was 3.21.

To 200 parts of the obtained solution of the ring-opening polymer of dicyclopentadiene, 0.037 part of 1,2-ethanediol was added as a terminator, and the mixture was heated to 60° C. and stirred for 1 hour to terminate the polymerization reaction. To this solution, 1 part of a hydrotalcite-like compound ("Kyowaad (registered trademark) 2000" manufactured by Kyowa Chemical Industry Co., Ltd.) was added. The mixture was heated to 60° C. and stirred for 1 hour. After that, 0.4 part of a filter aid ("Radiolite (registered trademark) #1500" manufactured by Showa Chemical Industry Co., Ltd.) was added, and the absorbent and the solution were filtered off through a PP pleated cartridge filter ("TCP-HX" manufactured by Advantec Toyo Kaisha, Ltd.).

To 200 parts (polymer amount: 30 parts) of the filtered solution of the ring-opening polymer of dicyclopentadiene, 100 parts of cyclohexane and 0.0043 part of chlorohydridocarbonyl tris(triphenylphosphine) ruthenium were added, and a hydrogenation reaction was performed under a hydrogen pressure of 6 MPa at 180° C. for 4 hours. Accordingly, a reaction liquid containing a hydrogenated product of the ring-opening polymer of dicyclopentadiene was obtained. This reaction liquid was a slurry solution with the hydrogenated product precipitated.

The hydrogenated product and the solution contained in the aforementioned reaction liquid were separated using a centrifuge, and dried under reduced pressure at 60° C. for 24 hours to obtain 28.5 parts of the hydrogenated product of the ring-opening polymer of dicyclopentadiene having crystallizability. This hydrogenated product had a hydrogenation rate of 99% or more, a glass transition temperature Tg of 93° C., a melting point (Tm) of 262° C., and a racemo·diad ratio of 89%.

To 100 parts of the obtained hydrogenated product of the ring-opening polymer of dicyclopentadiene, 1.1 parts of an antioxidant (tetrakis[methylene-3-(3',5'-di-t-butyl-4'-hydroxyphenyl)propionate]methane; "Irganox (registered trademark) 1010" manufactured by BASF Japan Ltd.) was mixed. After that, the mixture was charged in a twin screw extruder (product name "TEM-37B", manufactured by Toshiba Machine Co., Ltd.) having four die holes with an inner diameter of 3 mm. The mixture of the hydrogenated product of the ring-opening polymer of dicyclopentadiene and the antioxidant was molded into strands by hot-melt extrusion molding, and thereafter finely cut using a strand cutter to obtain pellets of a crystallizable resin. The operation conditions of the aforementioned twin screw extruder were as follows.

Barrel set temperature=270 to 280° C.
Die set temperature=250° C.
Screw rotation speed=145 rpm Example 1

(1-1. Production of Pre-Stretch Film)

The pellets of crystallizable resin produced in Production Example 1 were molded using a hot-melt extrusion film molder ("Measuring Extruder Type Me-20/2800V3" manufactured by Optical Control Systems Co.) equipped with a T die. The molded product was wound up around a roll at a speed of 1.5 m/min to obtain a long-length pre-stretch film (thickness: 50 μm) with a width of about 150 mm. The operation conditions of the aforementioned film molder were as follows.

Barrel temperature setting=280° C. to 300° C.
Die temperature=270° C.
Screw rotation speed=30 rpm
Cast roll temperature=80° C.

(1-2. Production of Stretched Film)

A stretching apparatus ("SDR-562Z" manufactured by Eto Co., Ltd.) was prepared. This stretching apparatus was an apparatus that contains clips capable of gripping end portions of a rectangular resin film and ovens and can perform biaxial stretching. Twenty four clips in total were provided: five per edge of the pre-stretch film and one per vertex of the pre-stretch film. The movement of these clips enabled stretching of the pre-stretch film. Also, two ovens were provided, which could be individually set to a stretching temperature and a heating treatment temperature. Furthermore, the aforementioned stretching apparatus allowed the transfer of the film from one oven to the other oven with the film gripped by the clips.

The pre-stretch film was cut into a rectangle of 130 mm in length×130 mm in lateral. The retardation of the pre-stretch film obtained by cutting was measured using a phase difference meter ("AxoScan OPMF-1" manufactured by Axometrics Inc.). The result was: in-plane retardation Re=5 nm and thickness-direction retardation Rth=6 nm. This pre-stretch film was attached to the aforementioned stretching apparatus, and treated at a preheat temperature of 110° C. for 10 seconds. After that, the pre-stretch film was stretched at a stretching temperature of 110° C., a lengthwise stretching ratio of 1 time, a lateral stretching ratio of 1.5 times, and a stretching speed of 1.5/10 seconds. Accordingly, a stretched film was obtained as a film that had been subjected to a stretching treatment.

The stretched film was removed from the stretching apparatus and cooled to normal temperature. FIG. 1 is a plan view schematically illustrating a stretched film 10 obtained in Example 1. As illustrated in FIG. 1, the stretched film 10 was equally partitioned into three in the longitudinal direction and three in the lateral direction to set nine measurement regions 11 to 19 having the same size and area. In the center of each of the measurement regions 11 to 19, the retardation and birefringence were measured using a phase difference meter ("AxoScan OPMF-1" manufactured by Axometrics Inc.). From the obtained measurement values, average values of the in-plane retardation Re, thickness-direction retardation, birefringence in the in-plane direction, and birefringence in the thickness direction of the stretched film 10 were calculated.

(1-3. Contact Between Stretched Film and Organic Solvent)

Figure 2:
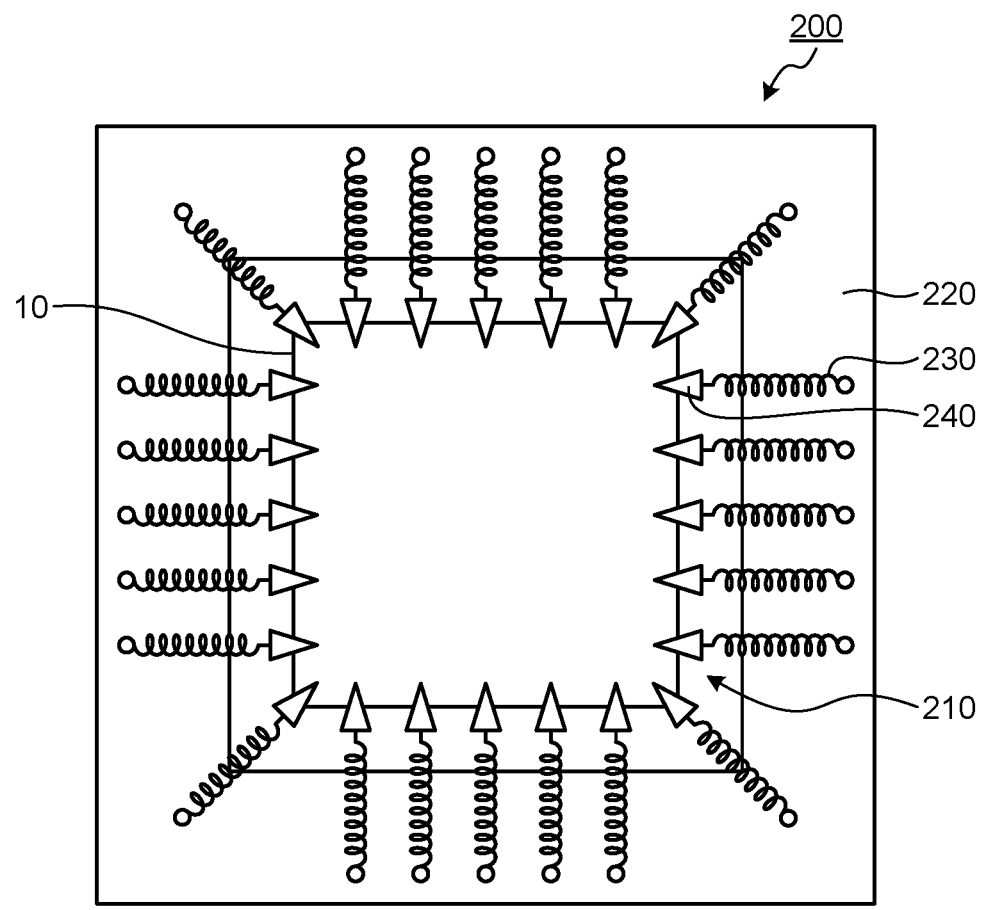
FIG. 2 is a plan view schematically illustrating a jig used in Example 1.

FIG. 2 is a plan view schematically illustrating a jig 200 used in Example 1. As illustrated in FIG. 2, the jig 200 for fixing the stretched film 10 was prepared. This jig 200 included a frame 220 disposed in a square shape in such a manner as to surround a space 210 where the stretched film 10 is to be attached, a plurality of springs 230 mounted to this frame 220, and clips 240 individually disposed to the tips of the springs 230. One end of each of the springs 230 was fixed to the frame 220 while the clip 240 was provided to the other end thereof. The total number of springs 230 and the total number of clips 240 were each 24, such that there were five locations per edge of the rectangular stretched film 10 and each vertex of the stretched film 10 can be gripped by the clips 240. Also, the springs 230 were disposed so as to pull the stretched film 10 for applying tension when the clips 240 at the tips of the springs 230 grip the stretched film 10. According to such a jig 200, desired tension could be applied to the stretched film 10 attached to the space 210 surrounded by the frame 220 by adjusting the elongation of the springs 230.

The stretched film was cut into a rectangle of 120 mm in length×120 mm in lateral. The stretched film 10 obtained by cutting was attached to the jig 200 as illustrated in FIG. 2. Specifically, the end portions of the stretched film 10 were gripped by the clips 240 (at 24 locations in total including five locations per edge and each vertex). Then, the elongation of the springs 230 was adjusted such that a tension of 40 N/m can be applied in both the longitudinal direction and the lateral direction of the stretched film 10. While fixed to the jig 200 to be applied with tension, the stretched film 10 was immersed in a vat filled with toluene as an organic solvent for 60 seconds to obtain a phase difference film.

(1-4. Drying)

After that, while fixed by the jig, the phase difference film was picked up from toluene, placed in an oven at 110° C., and subjected to a drying treatment for 60 minutes.

After that, the phase difference film was taken out from the oven, cooled to normal temperature, and further detached from the jig. The thus obtained phase difference film was equally partitioned into three in the longitudinal direction and three in the lateral direction to set nine measurement regions having the same size and area, in the same manner as that for the stretched film. Then, in the center of each of the measurement regions, the retardation and birefringence were measured using ("AxoScan OPMF-1" manufactured by Axometrics Inc.). From the obtained measurement values, the following values of the phase difference film were calculated: an average value and a coefficient of variation of the in-plane retardation; an average value and a coefficient of variation of the thickness-direction retardation; an average value and a coefficient of variation of the birefringence in the in-plane direction; an average value and a coefficient of variation of the birefringence in the thickness direction;

and an average value and a coefficient of variation of the NZ factor.

Furthermore, the thickness and solvent containing rate of the phase difference film were measured by the aforementioned methods.

Example 2

In the step (1-3), when the rectangular stretched film was attached to the jig, some of the clips were not used. Specifically, the clips gripped one pair of opposing edges (right edge and left edge in FIG. 2) and each vertex of the stretched film, and did not grip another pair of opposing edges (bottom edge and upper edge in FIG. 2) of the stretched film. Therefore, in Example 2, the contact between the stretched film and the organic solvent as well as the drying of the obtained phase difference film were performed in a state where a tension of 40 N/m was applied in the lateral direction of the film. Except for the abovementioned matters, the phase difference film was produced and evaluated by the same manner as that of Example 1.

Example 3

In the step (1-2), the lateral stretching ratio was changed to 2.5 times.

Except for this matter, a phase difference film was produced and evaluated by the same manner as that of Example 1.

Example 4

In the step (1-2), the lateral stretching ratio was changed to 2.5 times.

Further, in the step (1-3), when the rectangular stretched film was attached to the jig, some clips were not used. Specifically, the clips gripped one pair of opposing edges (right edge and left edge in FIG. 2) and each vertex of the stretched film, and did not grip another pair of opposing edges (bottom edge and upper edge in FIG. 2) of the stretched film. Therefore, in Example 4, the contact between the stretched film and the organic solvent as well as the drying of the obtained phase difference film were performed in a state where a tension of 40 N/m was applied in the lateral direction of the film.

Except for the abovementioned matters, the phase difference film was produced and evaluated by the same manner as that of Example 1.

Comparative Example 1

In the step (1-3) and the step (1-4), the stretched film and the phase difference film were not attached to a jig. Specifically, in the step (1-3), the stretched film was not attached to any tool and was brought into contact with the organic solvent, and in the step (1-4), the obtained phase difference film was dried in a state where it was adhered onto a flat plate with a tackiness tape.

Except for the abovementioned matters, the phase difference film was produced and evaluated by the same manner as that of Example 1.

Comparative Example 2

In the step (1-2), the lateral stretching ratio was changed to 2.5 times.

In the step (1-3) and the step (1-4), the stretched film and the phase difference film were not attached to a jig. Specifically, in the step (1-3), the stretched film was not attached to any tool and was brought into contact with the organic solvent, and in the step (1-4), the obtained phase difference film was dried in a state where it was adhered onto a flat plate.

Except for the abovementioned matters, the phase difference film was produced and evaluated by the same manner as that of Example 1.

Comparative Example 3

A stretched film was produced by the same manner as that of the steps (1-1) and (1-2) of Example 1. The stretched film was transferred to an oven for a heat treatment set at a heat treatment temperature of 170° C. while maintaining a state where the stretched film was not removed from the stretching apparatus ("SDR-562Z" manufactured by Eto Co., Ltd.) and gripped with clips at respective edges and vertexes of the film. The film was subjected to a heat treatment for 20 seconds with the oven to obtain a phase difference film. The obtained phase difference film was cooled and measured for an average and a coefficient of variation of in-plane retardation; an average and a coefficient of variation of thickness-direction retardation; an average and a coefficient of variation of birefringence in the in-plane direction; an average and a coefficient of variation of birefringence in the thickness direction; an average and a coefficient of variation of an NZ factor; thickness; and the solvent containing ratio, by the same manner as that of Example 1.

Comparative Example 4

At the time of producing a stretched film, the stretching ratio was changed to 2.5 times. Except for the abovementioned matters, a phase difference film was produced and evaluated by the same manner as that of Comparative Example 3.

<Results>

The results of Examples and Comparative Examples are indicated in the following table. In Comparative Examples 3 and 4, the stretched films obtained by a stretching treatment were subjected to a heating treatment without being removed from the stretching apparatus. Accordingly, optical characteristics of the stretched films could not be measured in Comparative Examples 3 and 4. Therefore, characteristics of stretched films separately produced by the same methods as those of Comparative Examples 3 and 4 were described in the columns of the stretched films according to Comparative Examples 3 and 4 in the following table.

In the following tables, used abbreviations represent as follows:

Re: in-plane retardation
Rth: thickness-direction retardation
CV(Re): coefficient of variation of in-plane retardation
CV(Rth): coefficient of thickness-direction retardation
Δn (in-plane direction): birefringence in in-plane direction
Δn (thickness direction): birefringence in thickness direction

TABLE 1

Results of Examples and Comparative Examples

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| stretching condition | | | | | | | | |
| stretching temperature [° C.] | 110 | 110 | 110 | 110 | 110 | 110 | 110 | 110 |
| stretching ratio | 1.5 | 1.5 | 2.5 | 2.5 | 1.5 | 2.5 | 1.5 | 2.5 |
| stretched film | | | | | | | | |
| average of Re [nm] | 61.9 | 61.9 | 115.0 | 115.0 | 61.9 | 115.0 | 61.9 | 115.0 |
| average of Rth [nm] | 77.3 | 77.3 | 92.8 | 92.8 | 77.3 | 92.8 | 77.3 | 92.8 |
| average of Δn(in-plane direction) [×10$^{-3}$] | 1.9 | 1.9 | 5.7 | 5.7 | 1.9 | 5.7 | 1.9 | 5.7 |
| average of Δn(thickness direction) [×10$^{-3}$] | 2.3 | 2.3 | 4.6 | 4.6 | 2.3 | 4.6 | 2.3 | 4.6 |

TABLE 1-continued

Results of Examples and Comparative Examples

|  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| contact with solvent | | | | | | | | |
| contact time [seconds] | 60 | 60 | 60 | 60 | 60 | 60 | — | — |
| tension [N/m] | 40 | 40 | 40 | 40 | — | — | — | — |
| tensile direction | longitudinal/lateral | lateral | longitudinal/lateral | lateral | — | — | — | — |
| drying | | | | | | | | |
| temperature [° C.] | 110 | 110 | 110 | 110 | 110 | 110 | — | — |
| time [minutes] | 60 | 60 | 60 | 60 | 60 | 60 | — | — |
| tension [N/m] | 40 | 40 | 40 | 40 | — | — | — | — |
| heat treatment | | | | | | | | |
| temperature [° C.] | — | — | — | — | — | — | 170 | 170 |
| time [seconds] | — | — | — | — | — | — | 20 | 20 |
| phase difference film | | | | | | | | |
| thickness [μm] | 39 | 39 | 21 | 22 | 40 | 22 | 24 | 18 |
| average of Re [nm] | 370.1 | 392.2 | 430.4 | 451.8 | 373.5 | 438.7 | 181.7 | 361.0 |
| CV(Re) [%] | 0.6 | 0.5 | 0.6 | 0.4 | 1.2 | 1.1 | 5.6 | 2.4 |
| average of Rth [nm] | 130.2 | 122.1 | 192.7 | 202.5 | 134.8 | 218.6 | 111.3 | 221.1 |
| CV(Rth) [%] | 0.8 | 1.0 | 0.9 | 0.9 | 2.0 | 2.4 | 6.2 | 3.2 |
| average of Δn(in-plane direction)[×10$^{-3}$] | 9.5 | 10.1 | 20.5 | 20.5 | 9.3 | 19.9 | 7.6 | 20.1 |
| coefficient of variation of Δn(in-plane direction) [%] | 0.6 | 0.5 | 0.6 | 0.4 | 1.2 | 1.1 | 5.6 | 2.4 |
| average of Δn(thickness direction) [×10$^{-3}$] | 3.3 | 3.1 | 9.2 | 9.2 | 3.4 | 9.9 | 4.6 | 12.3 |
| coefficient of variation of Δn(thickness direction) [%] | 0.8 | 1.0 | 0.9 | 0.9 | 2.0 | 2.4 | 6.2 | 3.2 |
| average of NZ factor | 0.85 | 0.81 | 0.95 | 0.95 | 0.86 | 1.00 | 1.11 | 1.11 |
| coefficient of variation of NZ factor [%] | 0.3 | 0.5 | 0.4 | 0.4 | 0.5 | 1.3 | 4.3 | 1.1 |
| solvent containing ratio (%) | 4 | 4 | 3 | 3 | 4 | 3 | non | non |

REFERENCE SIGN LIST

10 stretched film
11 to 19 measurement region
200 jig
210 space where a stretch film is to be attached
220 frame
230 spring
240 clip

The invention claimed is:

1. A phase difference film formed of a resin containing a polymer having crystallizability, wherein:
   the polymer has a positive intrinsic birefringence,
   a coefficient of variation CV(Re) of an in-plane retardation of the phase difference film at a measurement wavelength of 590 nm is 1.0% or less,
   an average value of a NZ factor of the phase difference film is more than 0.0 and less than 1.0,
   the phase difference film contains an organic solvent, and
   a ratio of the organic solvent relative to 100% by weight of the phase difference film is 0.01 ppm or more.

2. The phase difference film according to claim 1, wherein the polymer having crystallizability contains an alicyclic structure.

3. The phase difference film according to claim 1, wherein the polymer having crystallizability is a hydrogenated product of a ring-opening polymer of dicyclopentadiene.

4. The phase difference film according to claim 1, wherein the ratio of the organic solvent relative to 100% by weight of the phase difference film is 3% by weight or more.

5. The phase difference film according to claim 1, wherein the ratio of the organic solvent relative to 100% by weight of the phase difference film is 10% by weight or less.

6. The phase difference film according to claim 1, wherein the organic solvent is at least one selected from the group consisting of toluene, limonene, decalin, and carbon disulfide.

* * * * *